A. F. WITTEKIND.
COOKING UTENSIL.
APPLICATION FILED APR. 25, 1919.
1,347,428. Patented July 20, 1920.
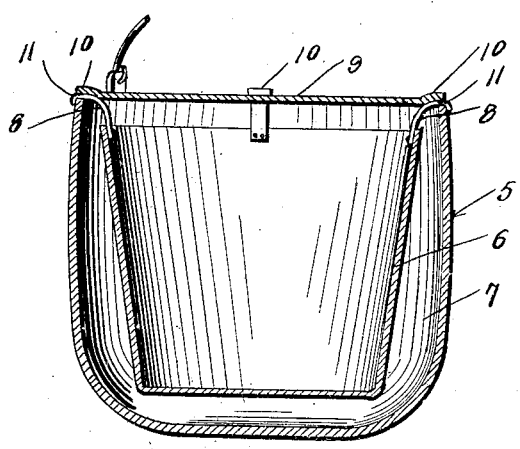
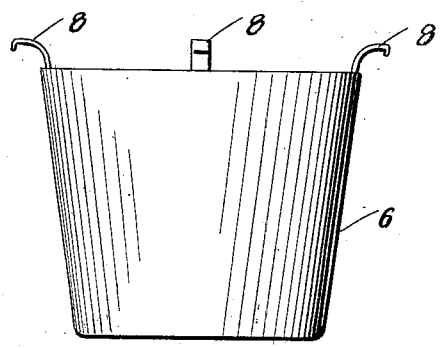
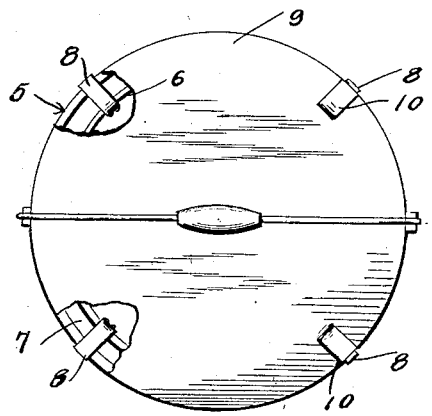
Inventor.
A. F. Wittekind.

UNITED STATES PATENT OFFICE.

ARNOLD F. WITTEKIND, OF TRENTON, NEW JERSEY.

COOKING UTENSIL.

1,347,428.  Specification of Letters Patent.  Patented July 20, 1920.

Application filed April 25, 1919. Serial No. 292,550.

*To all whom it may concern:*

Be it known that I, ARNOLD F. WITTEKIND, a citizen of the United States, residing at Trenton, in the county of Mercer and State of New Jersey, have invented certain new and useful Improvements in Cooking Utensils; and I do hereby declare the following to be a full, clear, and exact description of the invention, such as will enable others skilled in the art to which it appertains to make and use the same.

My invention relates to improvements in cooking utensils.

An important object of this invention is to provide means for arranging one cooking vessel within another cooking vessel in spaced relation thereto whereby food may be cooked within the inner vessel without the possibility of burning.

A further object of this invention is to provide a receptacle cover or lid for a two part vessel adapted to snugly fit over both the inner and outer vessel and provided with means for securely positioning itself.

A further object of this invention is to provide a cooking utensil of the character described which is neat, of highly simplified construction, and desirable in use.

Other objects and advantages of this invention will be apparent during the course of the following description.

In the accompanying drawing, forming a part of this specification and in which like numerals are employed to designate like parts throughout the same, Figure 1 is a vertical section through a cooking utensil embodied in my invention, Fig. 2 is a side elevation of the inner receptacle, and, Fig. 3 is a plan view of the utensil, parts thereof being broken away.

In the drawing, wherein for the purpose of illustration is shown the preferred embodiment of my invention, the numeral 5 designates an outer receptacle or vessel constructed of any desirable material and adapted to receive an inner vessel 6. As clearly illustrated in Fig. 1, the inner vessel 6 is of a lesser diameter and height than is the outer receptacle 5 thereby providing a water space 7. To suspend the inner receptacle 6 in spaced relation to the outer receptacle, I have provided a plurality of outwardly diverging arms or hooks 8 adapted to engage the upper side of the outer vessel 5. As is shown in Fig. 1, the top of the inner vessel 6 is disposed below the plane of the top of the outer vessel 5 thereby providing an air or steam space.

A cover 9 is adapted to be arranged over the inner and outer receptacle and has its peripheral portion provided with a plurality of struck up ears 10 adapted for engaging the top of the lugs or arms 8. The struck up portions 10 provide radial recesses 11 in the peripheral portion of the top in which the arms 8 are received. By reason of the engagement of the top or lid with the lugs 8, the lid is securely held in position and prevented from sliding off the receptacle or partaking of a rotary movement as is often the case.

In the use of my invention, it will be apparent that the outer vessel 5 is partly filled with water and the inner receptacle filled with food and arranged within the outer receptacle. The presence of the water precludes the possibility of the food within the inner receptacle becoming burned and retains the same moist.

While I have shown and described the preferred embodiment of my invention, it is understood that such minor changes in arrangement and construction of parts, as will remain within the spirit of the invention and the scope of the appended claim may be made.

Having thus described my invention, what I claim is:—

A cooking utensil of the character described including, inner and outer receptacles, longitudinally curved lugs attached to the inner side of the inner receptacle and extending upwardly and outwardly and engaging the top of the outer receptacle, and a closure having its peripheral portion engaging the top of said outer receptacle and provided with struck up portions engaging over said lugs, said struck up portions providing recesses in which the lugs are received.

In testimony whereof I affix my signature in presence of two witnesses.

ARNOLD F. WITTEKIND.

Witnesses:
AUGUSTA L. MASLOWSKY,
JOHN W. LEARY.